Patented July 14, 1931

1,814,025

UNITED STATES PATENT OFFICE

GREGG DOUGHERTY, OF PRINCETON, NEW JERSEY, ASSIGNOR TO E. C. KLIPSTEIN & SONS COMPANY, OF NEW YORK, N. Y., A CORPORATION OF NEW JERSEY

PROCESS OF MAKING KETONES OF THE BENZOPHENONE TYPE

No Drawing.   Application filed June 28, 1927.  Serial No. 202,161.

The present invention relates to processes of making ketones of the benzophenone type, and it relates more particularly to the manufacture of ketones of the benzophenone type from the benzoyl-benzoic acids. Specifically it pertains to the manufacture of benzophenone itself (diphenyl ketone) from ortho-benzoyl benzoic acid; but although this specific application of the principles of the invention is more particularly referred to and described in the following specification, it is to be understood that the description is illustrative only and that the invention can be utilized not only in the manufacture of benzophenone itself, but also its homologues and derivatives, these latter being obtainable, in accordance with the invention, from the corresponding homologues and derivatives of benzoyl benzoic acids.

The process involves the elimination of carbon dioxide from the compounds referred to, and one of its objects is the accomplishment of this liberation under conditions ensuring a high efficiency and the production of a yield of a high degree of purity. Further objects and advantages of the invention will become apparent from the description hereinafter.

The benzoyl-benzoic acids are solids at ordinary temperatures. On heating these acids to the melting point, and continuing the heating of the liquid to a fairly high temperature (250°–310° C.) I have found that some carbon dioxide passes off and benzophenone is formed. The yields, however, when the acids are heated alone in this way are relatively low and the benzophenone is contaminated by by-products. However, in the presence of suitable catalytic materials, especially metallic (i. e. metal or metal-containing) catalysts, the reaction proceeds much more rapidly and results in a much higher yield of benzophenone.

Although, in the specific preferred procedure hereinafter set forth, copper and/or the copper salt of ortho-benzoyl benzoic acid are mentioned as the catalysts employed, other suitable catalytic materials may be employed. While some catalytic materials produce better yields than others, those operative for the purposes of the invention are numerous. They may be grouped as follows:

a. Finely divided metals,
  b. Oxides and hydroxides of metals,
the metals in the last group being classified as 1. Those which form relatively unstable hydroxides or carbonates, and
  2. Those which form stable hydroxides and carbonates.

Referring to the finely divided metals which may be employed as catalysts in practicing the invention, examples of such are copper, nickel, cobalt, iron and platinum. The particles of the metals may be of almost any size but the more finely divided they are, the more rapid is the reaction. The usual procedure is to use metals of about the fineness of the copper in copper bronze powder, or what is obtained by reducing by means of hydrogen the powdered oxides of the metals. Elimination of carbon dioxide from the benzoyl-benzoic acid employed is facilitated when even traces of these metals are present in the mass being heated, and larger amounts increase the velocity of the reaction, but too large a percentage causes inconvenience in getting out the product. It has been found that, in employing ortho-benzoyl-benzoic acid, it is ordinarily convenient and desirable to use an amount of the catalyst such that its metal content shall be approximately from 0.5 to 5 per cent of the weight of the acid. These metallic catalysts greatly assist in eliminating carbon dioxide from the acid at temperatures of from 150° to 305.6° C., the velocity of the reaction increasing with rise in temperature.

Unless an extremely active catalyst is used such as platinum black, or copper, or nickel reduced from the oxide at low temperatures the velocity of reaction below 200° C. is apt to be too slow as a rule for practical purposes. On the other hand, too high a temperature, above about 290° C. causes decomposition, formation of by-products and the distillation of unchanged acid. The best practical working range, when using ortho-benzoyl-benzoic acid, is between 220° and 280° C.

To produce benzophenone with these catalysts, it is sufficient to mix the solid acid, such as ortho-benzoyl benzoic acid, and the catalyst in a container which may be heated and arranged for stirring and distillation. The mixture is heated and stirred to the desired reaction temperature, for example 250°–270° C., and maintained at that temperature while stirring until the evolution of carbon dioxide comes to an end. The temperature is then raised to the boiling point of benzophenone and the product is distilled over.

As examples of relatively unstable oxides and hydroxides (i. e. compounds of the oxide type) which may be used as catalysts may be mentioned any of the oxides or hydroxides of copper, nickel, cobalt and iron. With these the temperature range of reaction starts a little higher than when the finely divided metals previously indicated are employed. This temperature range is between 200° and 205.6° C., but the preferred temperature range is the same as with the metals, 220°–280° C. The procedure is about the same as when the finely divided metals are used, i. e., the ortho-benzoyl benzoic acid (e. g.) is mixed with such an amount of the powdered oxide or hydroxide that the metal content will be from, say, about 0.5 to 5 per cent of the weight of the acid. The mixture is heated with stirring at the desired reaction temperature, for example, 250°–270° C. until the carbon dioxide evolution is complete. Then the benzophenone is distilled over.

As to the catalysts or reaction-promoting agents consisting of oxides and hydroxides of metals which form stable hydroxides and carbonates, there may be mentioned by way of example the alkali metal and alkaline earth metal oxides and hydroxides. Since these catalysts take up carbon dioxide and do not liberate it again at the reaction temperature, and since in so doing they become inactive, it is necessary here to use one molecular weight of ortho-benzoyl benzoic acid to one molecular weight of the catalyst, the reaction being:

$C_6H_5.CO.C_6H_4.COOH + CaO \rightarrow$
$C_6H_5.CO.C_6H_5 + CaCO_3$

The reaction temperature is higher than in other cases. The powdered oxide or hydroxide is intimately mixed with the powdered acid and the mixture is heated to about the boiling point of benzophenone, 305°–306° C., when the product distills over as it is formed. The use of these more stable oxide catalysts is not so advantageous as the yields are lower and by-products are formed.

In addition to the above materials, there may be used as catalysts any salts or other compounds of metals which will yield, at temperatures below or within the reaction range (150°–305.6° C.), the active metals, oxides, or hydroxides. Examples are the copper, iron, nickel, cobalt salts of organic acids, particularly the salts of ortho-benzoyl benzoic acid itself or of such other benzoyl-benzoic acid as may be employed. These latter are precipitated when a soluble metallic salt solution such as the sulphate is added to a solution of the sodium salt of the benzoyl-benzoic acid. Both solutions are usually of 2 or 3 molar strength, but apparently the specific concentration is not material. The precipitated metal salt is filtered off, washed with cold water, and dried at 100° C. In using these salts as catalysts, the benzoyl-benzoic acid and the metal salt are most desirably mixed in such proportion that the actual metal content will be from 0.5 to 5 per cent of the weight of the ortho-benzoyl benzoic acid. The mixture is heated to the desired reaction temperature, for example 250° to 270° C. and maintained there, with stirring, until the carbon dioxide is all evolved, and then the benzophenone is distilled over.

When benzophenone is prepared from ortho-benzoyl benzoic acid in accordance with the invention, the reaction involved is as follows:

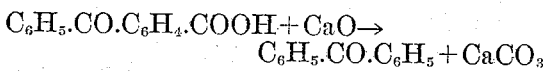

A desirable practical way of carrying out the invention for the manufacture of benzophenone comprises intimately mixing finely powdered ortho-benzoyl-benzoic acid with either about 1 to 2 per cent of its weight of clean dry finely divided copper (copper powder or "bronze"), or with about 10 per cent of its weight of the copper salt of ortho-benzoyl benzoic acid. This mixture is put into a distilling vessel which is equipped with a mechanical stirrer, and the vessel is heated until the contents are liquid. Then, while stirring, the temperature is allowed to rise to about 250° to 270° C. and it is maintained within that range until there is no further evolution of carbon dioxide gas. The vessel is now arranged for distilling and the benzophenone is distilled over until the distillate gets brown in color. The crude product may be further purified by crystallization from a solvent such as ethyl alcohol, methyl alcohol, benzene, etc.

Instead of employing a single catalyst, any combination of two or more of the catalysts hereinabove mentioned may sometimes be employed to advantage. This and other details of procedure may be varied without departing from the spirit and scope of the invention.

What is claimed is:

1. The process of producing ketones of the benzophenone type which comprises heating a benzoyl-benzoic acid to a temperature sufficiently high to cause liberation of carbon dioxide and formation of the desired ketone.

2. The process of producing benzophenone which comprises heating ortho-benzoyl-benzoic acid to a temperature sufficiently high to liberate carbon dioxide, with resulting formation of benzophenone.

3. The process of producing benzophenone, which comprises heating ortho-benzoyl-benzoic acid mixed with a metallic cataylst to a temperature sufficiently high to cause liberation of carbon dioxide and formation of benzophenone, and recovering the benzophenone so produced.

4. The process of producing benzophenone which comprises heating ortho-benzoyl-benzoic acid mixed with a catalyst to a temperature between about 150° and 305° C. and recovering the benzophenone so produced.

5. The process of producing benzophenone which comprises heating ortho-benzoyl-benzoic acid mixed with a catalyst comprising an oxygen compound of a metal to a temperature between about 200° and 305° C., and recovering the benzophenone so produced.

6. The process of producing benzophenone which comprises heating ortho-benzoyl-benzoic acid mixed with a catalyst to a temperature between about 240° C. and 280° C., and recovering the benzophenone so produced.

7. The process of producing ketones of the benzophenone type which comprises heating a benzoyl-benzoic acid mixed with a metallic catalyst to a temperature sufficiently high to cause liberation of carbon dioxide and formation of the desired benzophenone.

8. The process of producing benzophenone which comprises mixing ortho-benzoyl-benzoic acid with a catalyst comprising a relatively unstable oxygen compound of a metal, the metal content of the catalyst employed being from about 0.5 to 5 per cent by weight of the acid used, and heating the mixture to a temperature between about 200° C. and 305° C.

9. The process of producing benzophenone which comprises mixing ortho-benzoyl-benzoic acid with a catalyst comprising a relatively unstable metal compound of the oxide type, heating the mixture to the temperature sufficiently high to cause liberation of carbon dioxide with resultant formation of benzophenone, and recovering the benzophenone so produced.

10. The process of producing benzophenone which comprises mixing ortho-benzoyl-benzoic acid with a catalyst comprising a relatively unstable metal compound and heating the mixture to a temperature sufficiently high to liberate carbon dioxide, and recovering the benzophenone so produced.

11. The process of producing benzophenone which comprises mixing ortho-benzoyl-benzoic acid with a metallic catalyst, the metal content of the catalyst being from about 0.5 to 5 per cent by weight of the acid used, heating the mixture to between about 150° C. and 305° C. and recovering the benzophenone so produced.

12. The process of producing benzophenone which comprises mixing ortho-benzoyl-benzoic acid with a metallic catalyst, the amount of catalyst being about 1 to 2 per cent of the weight of the acid, heating the mixture to between approximately 250° C. and 270° C., and recovering the benzophenone so produced.

13. The process of producing benzophenone which comprises maintaining a mixture of ortho-benzoyl-benzoic acid with a catalyst comprising a metal salt of ortho-benzoyl-benzoic acid at a temperature sufficiently high to liberate carbon dioxide with resultant formation of benzophenone, and recovering the resultant benzophenone.

14. The process set forth in claim 13, further characterized by the fact that the catalyst comprises a copper salt or ortho-benzoyl-benzoic acid.

15. The process of producing benzophenone which comprises mixing ortho-benzoyl-benzoic acid with a catalyst comprising a metal salt of ortho-benzoyl-benzoic acid, heating the mixture to a temperature sufficiently high to liberate carbon dioxide, and recovering resultant benzophenone.

16. The process of producing ketones of the benzophenone type which comprises heating a benzoyl-benzoic acid in the presence of a catalyst comprising a salt of an organic acid, to a temperature sufficiently high to cause liberation of carbon dioxide and formation of the desired ketones.

17. The process set forth in claim 16, further characterized by the fact that the catalyst comprises a salt of the benzoyl-benzoic acid employed.

18. The process of producing ketones of the benzophenone type which comprises heating a benzoyl-benzoic acid in the presence of a finely divided catalytic metal to a temperature sufficiently high to cause liberation of carbon dioxide and formation of the desired ketone.

19. The process of producing benzophenone which comprises heating ortho-benzoyl-benzoic acid in mixture with a finely divided catalytic metal to a temperature sufficiently high to cause liberation of carbon dioxide, and recovering resultant benzophenone.

20. The process set forth in claim 19, further characterized by the fact that the catalytic metal employed is copper.

In testimony whereof I hereunto affix my signature.

GREGG DOUGHERTY.